(12) United States Patent
Lysen

(10) Patent No.: US 7,021,156 B2
(45) Date of Patent: Apr. 4, 2006

(54) MEASUREMENT DEVICE FOR DETERMINING THE STRAIGHTNESS OF SHAFTS OR SHAFT TUNNELS

(75) Inventor: Heinrich Lysen, Garching (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 11/071,199

(22) Filed: Mar. 4, 2005

(65) Prior Publication Data

US 2005/0193806 A1    Sep. 8, 2005

(30) Foreign Application Priority Data

Mar. 5, 2004    (DE) .................. 10 2004 011 404

(51) Int. Cl.
*G01L 1/24*    (2006.01)
(52) U.S. Cl. ...................................................... 73/800
(58) Field of Classification Search ............ 73/862.453, 73/862.324, 862.326, 703, 756, 800
See application file for complete search history.

(56) References Cited

U.S. PATENT DOCUMENTS

| | | | | |
|---|---|---|---|---|
| 4,747,689 A | * | 5/1988 | Aldred | 356/638 |
| 4,884,889 A | * | 12/1989 | Beckwith, Jr. | 356/620 |
| 5,507,097 A | * | 4/1996 | Duey et al. | 33/286 |
| 5,900,938 A | * | 5/1999 | Huang | 356/508 |
| 6,342,946 B1 | | 1/2002 | Holstein | |
| 6,519,042 B1 | * | 2/2003 | Wu | 356/487 |
| 6,784,986 B1 | * | 8/2004 | Lysen et al. | 356/152.2 |

\* cited by examiner

*Primary Examiner*—Max Noori
(74) *Attorney, Agent, or Firm*—David S. Safran

(57) ABSTRACT

A device for determining the straightness of shafts or shaft tunnels in segments is used preferably in larger water craft, but can also be used for measurement of oil pipelines. A first and a second adapter which each contain an optical transmitting and receiving device. The receiving devices are able to detect the location and direction of incidence of the light beams or laser beams incident on them. In this way, it is possible to quantitatively determine the parallel and angular offset of shafts, shaft tunnels or pipelines in segments by one single measurement process at a time. The adapters preferably have an identical form and work in the same way.

3 Claims, 2 Drawing Sheets

MEASUREMENT DEVICE FOR DETERMINING THE STRAIGHTNESS OF SHAFTS OR SHAFT TUNNELS

BACKGROUND OF THE INVENTION

1. Field of Invention

The invention relates to a measurement device and a corresponding measurement process for determining the straightness of shafts, shaft tunnels, especially those in motorized water craft, pipelines and other tubular articles. The invention also relates to processes for determining the exact alignment of machine shafts or spindles on machine tools relative to the axis of another shaft or spindle as well as of pipelines or other tubular articles.

2. Description of Related Art

A measurement device and a process for determining the alignment of a shaft tunnel or a pipe are described in German Patent Application DE 199 43 502 and corresponding U.S. Pat. No. 6,342,946. The measurement process of this disclosure assumes that the shaft tunnel can be measured with the shaft removed. This assumption normally does not apply in hurried ship repair work or at sea.

SUMMARY OF THE INVENTION

A primary object of the present invention is devise a measurement device and a measurement process which can be used, especially, to determine the straightness of shafts or shaft tunnels of motorized water craft and is especially suited for being used at sea.

Another object of the invention is to devise a measurement means which requires simply direct contact with shafts, a shaft tunnel, pipelines and other tubular articles which are to be measured so that measurements in several angular positions on the periphery of the shaft, can therefore be omitted.

These objects are achieved by a device and a measurement process according to the present invention which uses adapters with light transmitters and receivers, and electronics for determining both the translational parallel offset and also the angular offset of the adapters relative to one another according to two degrees of freedom at a time.

In accordance with a preferred embodiment, the invention is based on a laser optic measurement process which provides for two laser measurement beams which operate independently of one another together with the corresponding position detectors and downstream electronics for detection of the laser beams.

The invention is explained in detail below with reference to the accompanying drawings.

DETAILED DESCRIPTION OF THE INVENTION

Figure 1:
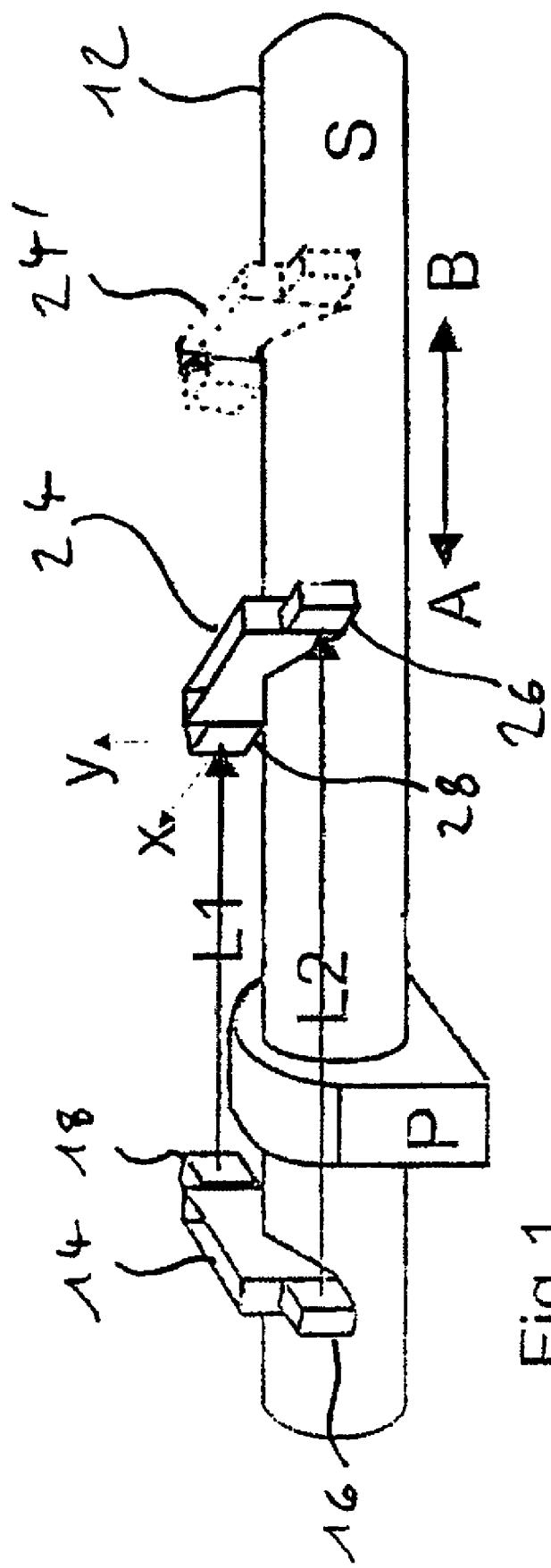
FIG. 1 is a schematic perspective of a supported shaft with the measurement device in place and FIG. 2 shows the geometrical conditions when the attached detectors of the measurement device tilted.

The arrangement shown schematically in FIG. 1 can relate to a rod or tube shaped stock S which is supported in a bearing bracket P, or mounted in a shaft tunnel, or mounted in a pipeline or the like.

Light transmitters 16, 18 are attached to an adapter 14 and which has an inverted V-shaped bottom that is suited to be placed on the cylindrical surface of the stock S. These emitters are able to send light beams L1 and L2 with essentially parallel alignment in the direction of the respective detectors 28, 26 according to known technology for producing individual light beams, especially laser light beams for measurement purposes. In conjunction with the measurement object achieved here, it is novel to provide and operate two such light transmitters simultaneously (optionally in a time sequence) in an arrangement and in such a way that the light beams L1, L2 are aligned parallel to one another. The alignment of the light beams or laser beams L1, L2 arises from the structural combination of the adapter 14 and the light transmitters 16, 18 attached there, and of course, also from the construction arrangement of the actual light-producing devices within the housings of the transmitters 16, 18. As shown, when the adapter 14 is placed on the stock S, automatic alignment of the light beams L1, L2 parallel to an axial section of the shaft defined there (therefore locally) is produced. For an ideal shaft, the light beams L1, L2 would therefore run parallel to its axis. For measurement ranges of less than 100 meters the inevitable widening of the light beams can remain essentially ignored.

At a distance from the combination of the adapter 14 and the light transmitters 16, 18, which combination is placed on the shaft and which distance can be made variable, a similarly built combination comprising a second adapter 24 and detectors 26, 28 is placed on the stock S. The detectors 26, 28 are able to identify not only the incidence site of the light beams according to two coordinates (x, y), but the direction of incidence of one light beam can also be determined, as is known for a single detector. The latter combination is made such that, in the ideal case, the two light beams L1, L2 are incident exactly in the center on the photosensitive and position-sensing detector elements (not shown) of the detectors 26, 28. If the shaft has a curvature or other deviations from the ideally straight shape, the two light beams will be incident on the detectors with an offset, and optionally, with an oblique angle of incidence.

Figure 2:
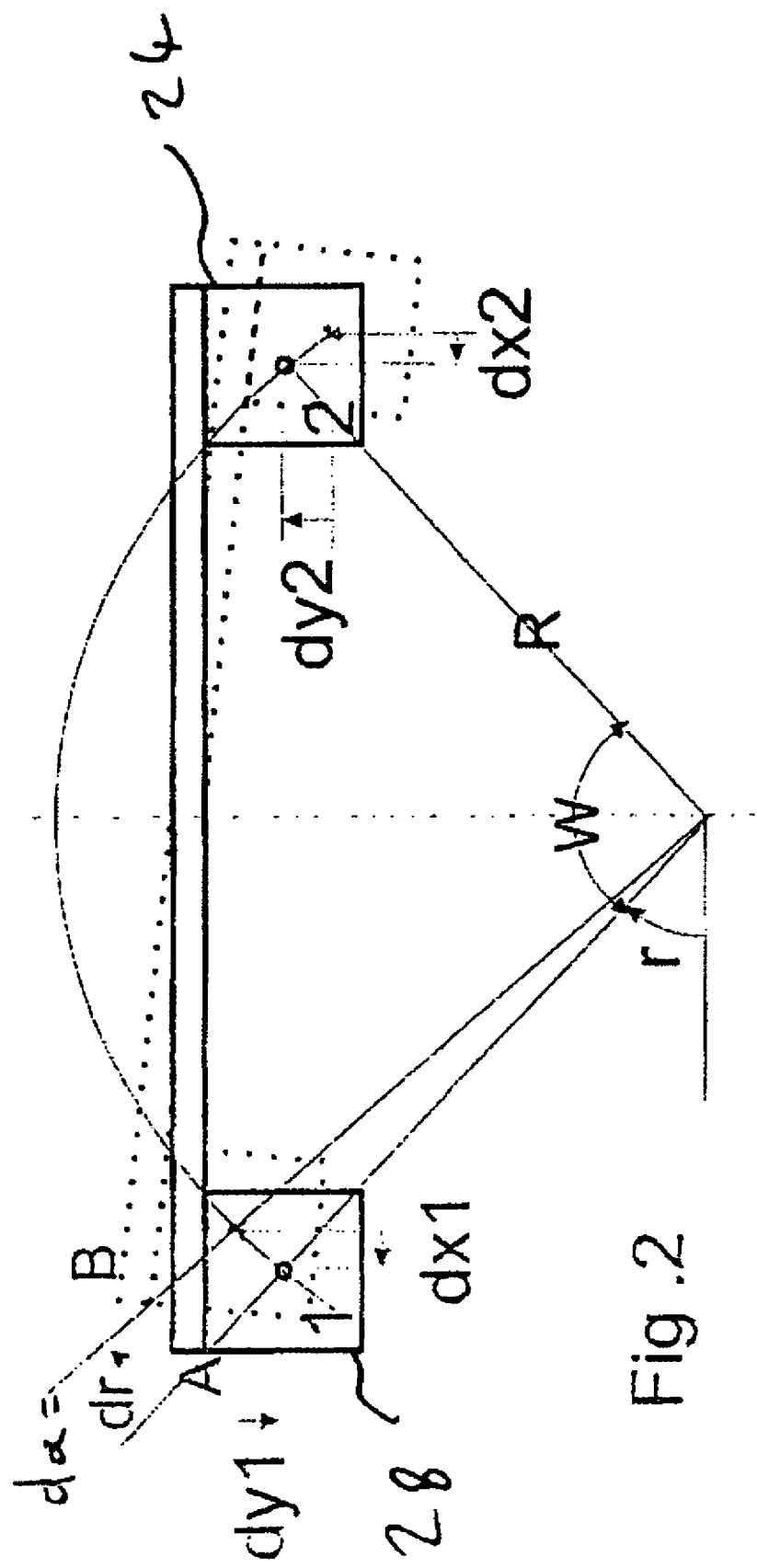

When the sensor combination is tilted around an ideal shaft, therefore in the direction of a shaft tangent, the two light beams will likewise be incident non-centrally on the detectors 26, 28. As is shown schematically in FIG. 2, this situation can be mathematically analyzed and equalized. Simultaneous displacement of the two points of incidence along a circular arc with an allowable radius can be regarded as negligible for the desired measurement result; for further computations, optionally, the angle of inclination $dr=d\alpha$ need be considered.

It is apparent that deviations of the angle of incidence of the two light beams from the set point value of 90°, in any case, indicate a deformed shaft piece.

With the arrangement as shown in FIG. 1, therefore, for individual local segments of shafts, it is possible to check with one single measurement at a time whether these segments do or do not have axes which lie completely coaxially to one another. Measurement is therefore feasibly repeated in segments, i.e., the sensor combination is moved from the illustrated measurement position A into the measurement position B in order to likewise obtain a measurement result immediately. The sensor combination in the measurement position B is labeled 24'. Of course, it is also possible to leave the sensor combination in its position and instead to move the transmitting combination (14, 16, 18) along the shaft or a cylindrical article which is to be measured.

In another, especially advantageous configuration of the invention, moreover, it is possible to work with two transmitting and receiving combinations of identical structure. For example, in the viewing direction of the laser beam or light beam, these combinations are equipped on the right side with a light transmitter, while on the left side of the adapter, a sensor is mounted. As explained above, the sensors here must also be able to determine the point of incidence of the laser beam according to two Cartesian coordinates, and in addition, to also correctly identify the direction of incidence of the light beam. For this purpose, in other configurations of the invention, there can be beam paths which deviate from the version shown in FIG. 1, but which are known in and of themselves.

Altogether, the invention enables measurement of the straightness of cylindrical articles along local axial segments. The advantage of the apparatus of the invention and of the corresponding measurement process is that, immediately after positioning of the measurement device over the axial segments of interest, the desired measurement result can be displayed with respect to parallel offset and angular offset of these axial segments relative to one another.

What is claimed is:

1. Measurement device for determining the straightness of shafts or shaft tunnels, comprising:

a first adapter configured for placement on a shaft or a cylindrical surface and which has a respective device for transmitting and for receiving and for detecting the location and the direction of incidence of at least one light beam of defined cross section, and a second adapter is configured for placement on the shaft or cylindrical surface and which has a respective device for transmitting and for receiving and for detecting the location and the direction of incidence of at least one light beam of defined cross section, and electronics operationally connected to the devices for receiving and detecting light beams and which is adapted for quantitatively determining both translational parallel offset and also angular offset of said adapters relative to one another according to two degrees of freedom for each type of offset.

2. Use of the measurement device as claimed in claim 1 in the detection of metrological data on machine tools.

3. Use of the measurement device as claimed in claim 1 in the detection of metrological data on pipes, especially pipelines.

* * * * *